United States Patent
Bergstrom et al.

(10) Patent No.: US 6,523,883 B1
(45) Date of Patent: Feb. 25, 2003

(54) ARRANGEMENT AND METHOD FOR FASTENING A FLAT COMPONENT AT A VEHICLE

(75) Inventors: Ake Bergstrom, Mariefred (SE); Per-Arne Eriksson, Rönninge (SE)

(73) Assignee: Scania CV AB (Publ) (SE)

( * ) Notice: Subject to any disclaimer, the term of this patent is extended or adjusted under 35 U.S.C. 154(b) by 0 days.

(21) Appl. No.: 10/089,778

(22) PCT Filed: Sep. 28, 2000

(86) PCT No.: PCT/SE00/01875
§ 371 (c)(1),
(2), (4) Date: Mar. 29, 2002

(87) PCT Pub. No.: WO01/23248
PCT Pub. Date: Apr. 5, 2001

(30) Foreign Application Priority Data

Sep. 29, 1999 (SE) .............................................. 9903516

(51) Int. Cl.⁷ .................................................. B60J 7/00
(52) U.S. Cl. ..................... 296/187; 296/182; 296/183; 24/306; 24/442
(58) Field of Search ............................ 296/187, 24.1, 296/146.15, 191, 178, 183, 181, 182; 410/118; 49/502; 52/204.591, 204.62; 24/442, 306

(56) References Cited

U.S. PATENT DOCUMENTS

| | | | | |
|---|---|---|---|---|
| 3,686,718 A | * | 8/1972 | Brumlik | 24/306 |
| 3,732,600 A | * | 5/1973 | Perina | 24/306 |
| 3,863,412 A | | 2/1975 | Bodycomb et al. | 52/483 |
| 3,905,071 A | * | 9/1975 | Brumlik | 24/306 |
| 4,226,465 A | * | 10/1980 | McCullough | 296/182 |
| 4,245,863 A | | 1/1981 | Carter | 296/39 R |
| 4,341,331 A | * | 7/1982 | McDougall | 224/219 |
| 4,357,048 A | * | 11/1982 | Zehnder et al. | 296/183 |
| 4,368,902 A | * | 1/1983 | McDowell | 296/24.1 |
| 4,870,725 A | * | 10/1989 | Dubowik | 24/442 |
| 4,928,575 A | | 5/1990 | Smirlock et al. | 89/36.02 |
| 5,007,670 A | * | 4/1991 | Wise | 296/39.1 |
| 5,152,037 A | * | 10/1992 | Schiek et al. | 24/306 |
| 5,656,351 A | * | 8/1997 | Donaruma | 24/442 |
| 5,762,645 A | * | 6/1998 | Peck et al. | 24/306 |
| 5,766,385 A | * | 6/1998 | Pollard et al. | 24/442 |
| 5,806,909 A | | 9/1998 | Wise | 296/39.1 |
| RE36,779 E | * | 7/2000 | Takizawa et al. | 24/442 |
| 6,146,369 A | * | 11/2000 | Hartman et al. | 24/442 |
| 6,283,538 B1 | * | 9/2001 | Reitnouer | 296/182 |
| 6,348,252 B1 | * | 2/2002 | Kenney et al. | 24/442 |
| 6,434,802 B1 | * | 8/2002 | Pannone | 24/306 |
| 2002/0125605 A1 | * | 9/2002 | Lacey et al. | 24/442 |

FOREIGN PATENT DOCUMENTS

WO 92/08017 5/1992

\* cited by examiner

Primary Examiner—Kiran Patel
(74) Attorney, Agent, or Firm—Ostrolenk, Faber, Gerb & Soffen, LLP

(57) ABSTRACT

The invention relates to an arrangement and a method for fastening panel-like elements to a vehicle. The arrangement incorporates a first part of a velcro® fastening the latter consisting of a hook part and a felt part which is attached to the panel element, and a second part of the velcro fastening which is attached to the part of the vehicle which is intended to support the panel element. The portion of the surface of the panel element where the first part of the velcro® fastening is arranged is situated centrally to, but at a predetermined distance from, the portion of the surface of the vehicle part where the second part of the velcro® fastening is arranged. In fastening a panel element, e.g. a wearing layer, to a vehicle, at least a first part of the velcro® fastening is attached to the panel element before the latter is placed in the vehicle. The velcro® fastening's second part may either be hooked securely to the first part when the latter is fastened to the panel or be fastened to the vehicle separately.

19 Claims, 3 Drawing Sheets

ARRANGEMENT AND METHOD FOR FASTENING A FLAT COMPONENT AT A VEHICLE

The present invention relates to an arrangement for fastening a panel-like element to a vehicle using a hook and loop, e.g. a velcro fastening and also relates to a method for fastening a panel-like element to a vehicle using such a fastening.

STATE OF THE ART

The manufacture of heavy vehicles, such as truck and buses, involves their loadbearing structure being provided with a load surface. The load surface of a truck generally incorporates a wearing layer consisting of, for example, plywood attached securely to the vehicle's platform. The load surface of a bus consists of a floor which is fitted to the bus chassis and is thereafter covered with carpeting.

Load surfaces are fastened to vehicles by means of various types of threaded connection, e.g. by nut and bolt combinations in predrilled holes or by self drilling, self-tapping screws. Such arrangements are time-consuming in that a large number of bolts or screws are required for fastening the load surface securely to withstand the shearing forces which may occur. In bus assembly, the process is more time-consuming in that the heads of the bolts or screws have also to be filled so that the load surface is even before carpeting is bonded to it.

If the load surface has for any reason to be disassembled, this is also a lengthy procedure in that all the screws or bolts have to be unscrewed before the load surface can be removed from the vehicle's loadbearing structure.

The holes in the load surface and in the vehicle's loadbearing structure render these components more liable to, for example, rust attack than corresponding components without holes.

U.S. Pat. No. 4,928,575 refers to the fastening of armour plating to military vehicles by means of velcro fastenings. One part of the velcro fastening is arranged on the outer surface of the military vehicle and the other part on a planar armour panel which can thereby be hooked securely to the vehicle. As both parts of the velcro fastening are attached to the outside of the respective surfaces, the fastening is compressed when subjected to high spot-loads. This results in the velcro fastening being crushed, with local loss of bonding capacity.

OBJECT OF THE INVENTION

The object of the present invention is to eliminate the abovementioned disadvantages and provide a method and an arrangement for quickly and easily fastening load surfaces to a vehicle's loadbearing structure in such a way that the fastening is effected without holes and is easy to undo. This object is achieved according to the invention by providing first and second surfaces, respectively on a panel to be attached to a vehicle and on a part of the vehicle to which the panel is to be attached. Each surface has one part of a velcro fastening, the hook part on one surface and the felt part on the other surface, with the areas on the first and second surfaces on which the first and second velcro fastening parts are disposed being situated centrally to each other and being located on the surfaces as to slightly separate the surfaces at the area so that the velcro fastening is not crushed at the areas in the surfaces. Various configurations are disclosed including a recess in at least one of the surfaces which receives the respective one of the velcro parts and the recess separates the surfaces at the areas so that the velcro parts can contact but are not crushed. Various orientations of the velcro parts are disclosed.

Load surface fitting becomes significantly easier if the load surface and the loadbearing structure are each provided with appropriate parts of a velcro fastening. There is thus no need to drill any holes or fasten any threaded connections, thereby saving a great deal of assembly time. In the case of bus floors, filling the heads of bolts or screws is also dispensed with.

To prevent the velcro fastening being compressed at high spot-loads and thereby risking being crushed, one part of the velcro fastening is arranged in a recess either in the load surface or in the loadbearing structure. Alternatively, spacing elements may be arranged between the load surface and the loadbearing structure in such a way that the two parts of the velcro fastening can engage securely but without risking being crushed by high spot-loads.

This type of fastening arrangement can absorb large shearing forces while at the same time simplifying the fitting and any replacement of load surfaces. It also has noise damping properties.

The arrangement according to the invention and further features and advantages of the associated method of assembly are indicated by the ensuing description of an embodiment with reference to the attached drawings.

LIST OF DRAWINGS

The invention will now be described in more detail in the form of two non-limitative embodiments illustrated by the attached drawings, in which.

DESCRIPTION OF AN EMBODIMENT

Figure 1:
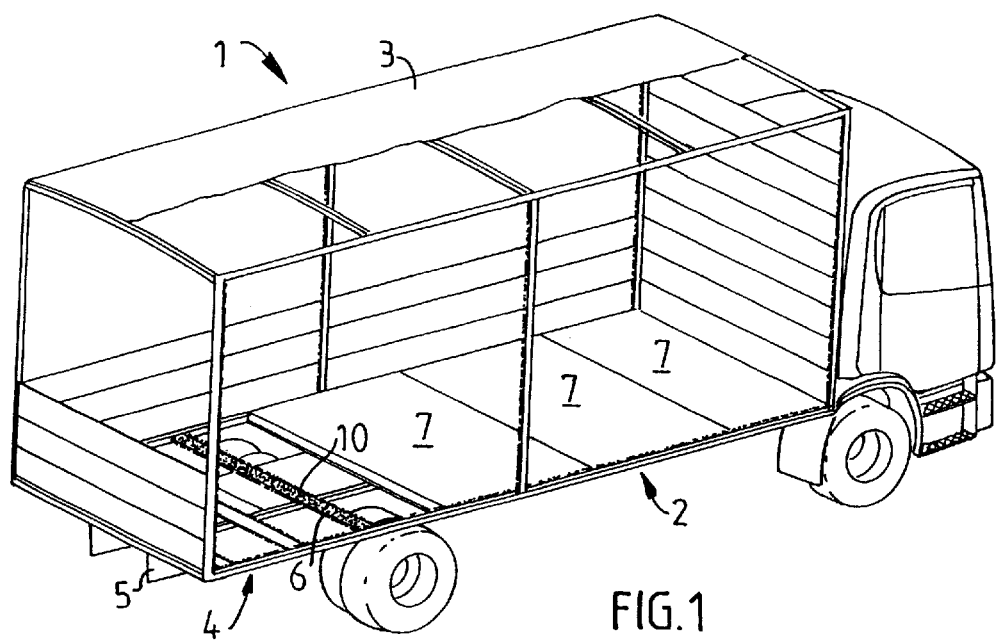
FIG. 1 depicts a perspective view of a truck whose platform supports a wearing layer which is fastened by an arrangement according to the present invention.

FIG. 1 depicts a truck (1) with a platform (2), the latter being provided with a superstructure (3). The vehicle incorporates a loadbearing structure (4) consisting partly of two elongate members (5) which run longitudinally in the vehicle's direction of movement, and partly of a number of cross-members (6) securely mounted on these elongate members. These cross-members (6) have resting on them a number of panel-like elements (7) fastened to them by means of velcro fastenings (10) seen in FIGS. 1 and 2 on the cross members. The panel elements (7) form a wearing layer on the platform and may be made of, for example, plywood, aluminium or polymer-based composites. Instead of a number of panels, the wearing layer may consist of one large panel element covering the whole platform.

Figure 2:
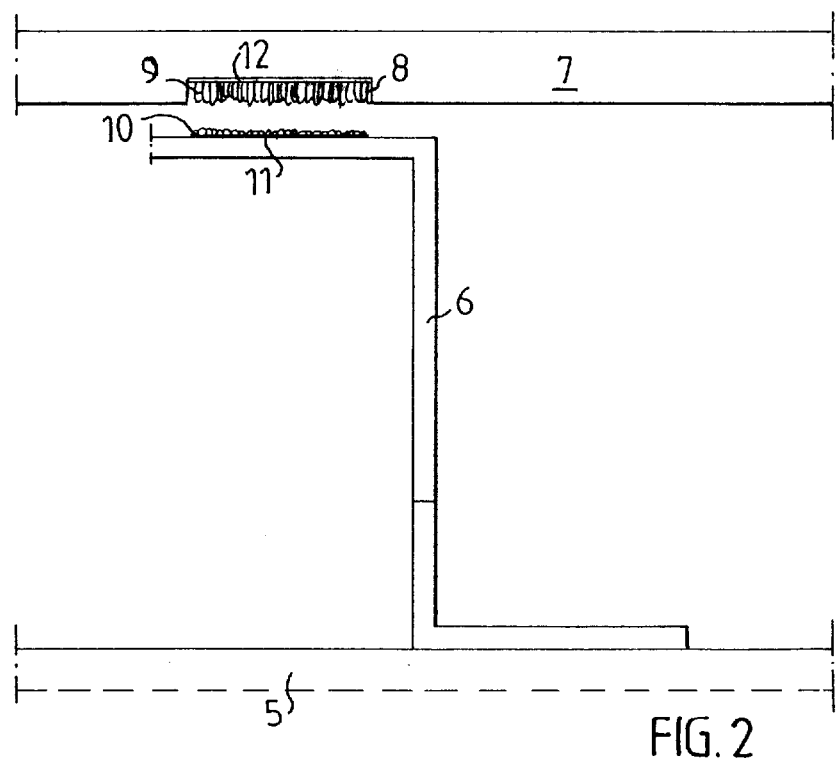
FIG. 2 depicts in detail a fragment of a longitudinal and vertical section of the arrangement in FIG. 1.

FIG. 2 depicts a section along the vehicle showing how a panel element is fastened to the vehicle's loadbearing structure. For the sake of clarity, the panel element (7) and the cross-member (6) are separated from one another in the diagram. The transverse members (6) have in this example a Z profile but other profiles may of course also be used. The panel element (7) has a recess (8) on its underside. In the diagram, the depth of said recess (8) is exaggerated for the sake of clarity. In this recess, a first part (9) of a two-part velcro fastening is arranged, preferably by adhesive bonding. A second part (10) of the velcro fastening is arranged on the portion of the upper part (11) of he cross-member (6) which is situated centrally to the recess in the panel. The two parts of the fastening consist of a hook part (9) and a felt part (10). The hook part has a large number of hooks which hook securely into the felt when the two parts of the velcro fastening are brought together, resulting in a stable fastening which can absorb large shearing forces. For example, Klettostar 53248-37 with unbrushed loops may be used as the felt part (10) and Pressotex 75161-22 bonding element as the hook part (9).

The surfaces (12,11) on which the velcro fastening's two parts (9,10) are arranged on the panel element (7) and the cross-member (6) respectively are situated at a distance from one another due to the recess (8). The advantage of this is that the velcro fastening is not crushed by large spot-loads on the platform. The distance between the surfaces (12,11) when the panel element (7) is placed on the cross-member (6) is such that the hook part (9) can reliably hook securely into the felt part (10) while at the same time the hook part (9) is protected from crushing at high spot-loads. For both of these criteria to be fulfilled, the depth of the recess has to be less than half the combined thickness of the hook part and the felt part when they are separated from one another, otherwise the hooks (9) do not engage with the felt part (10) when the two parts are brought together. At the same time, the depth of the recess has to be more than 5% of said combined thickness of the velcro parts in order to prevent crushing. The velcro fastenings (9,10) may also be taken to be fastened to planar surfaces, i.e. with recess depth nil, but in that case the velcro may be crushed at high spot-loads. In an advantageous embodiment, the recess depth is one-quarter of the combined thickness of the hook part and the felt part. Crushing in the case of this embodiment is best prevented if the hook part (9) is arranged in the recess (8), but it would also be possible to situate the felt part (10) there and the hook part (9) on the cross-member 6.

In this embodiment, the velcro fastening's two parts (9,10) are preferably arranged in elongate strips on all the cross-members (6) and in the corresponding recesses (8) in the panel element (7). The strip width is optimised with regard to a number of factors and may, for example, be 25 mm. A wide strip absorbs more shearing force than a narrow one but is more expensive and more difficult to handle. Wider or more strips result in no linear increase in shearing force absorption, so it may generally be advantageous to strengthen the velcro fastening by means of suitably spaced threaded connections rather than to increase the velcro surface to the extent that would be necessary for absorbing very large shearing forces.

Figure 3:
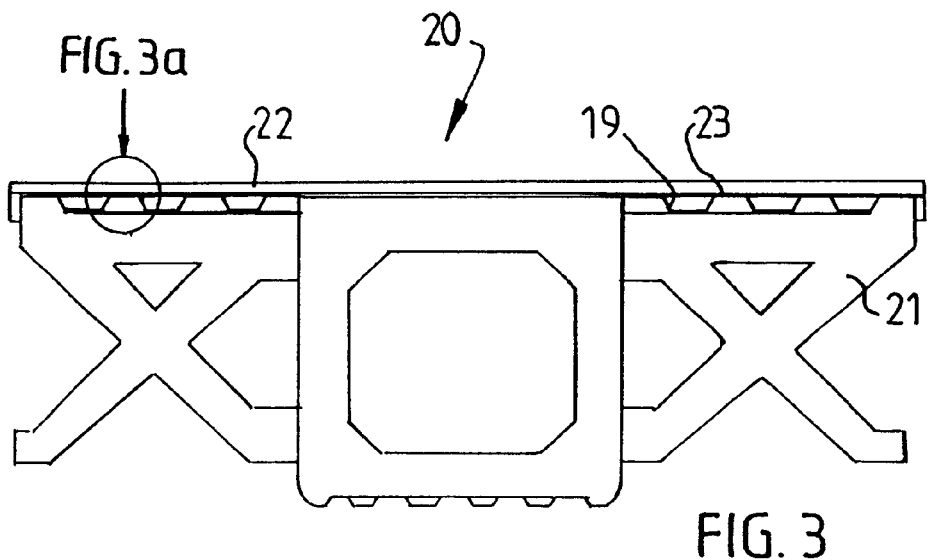
FIG. 3 depicts an alternative embodiment of the arrangement according to the invention.
Figure 3A:
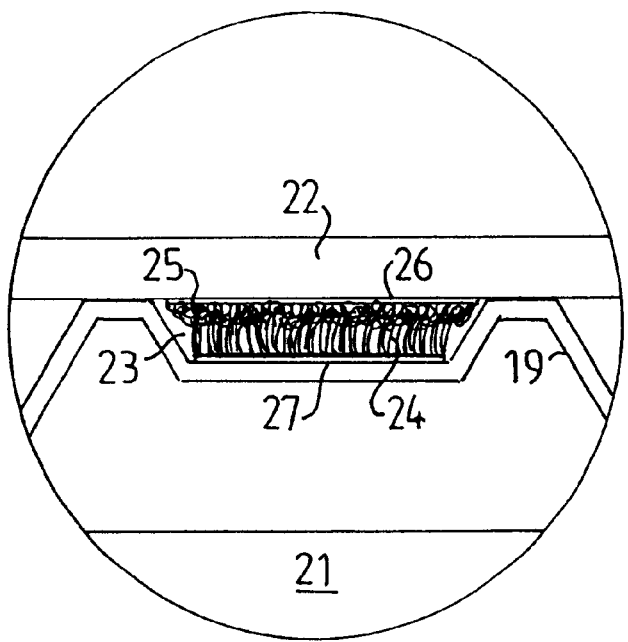

FIGS. 3 and 3a depict an alternative embodiment of the arrangement according to the invention. It shows a cross-section (20) of a vehicle platform which incorporates a loadbearing structure (21) which extends along the whole length and width of the platform. The loadbearing structure, which is described in more detail in our previously submitted application 9901373-2, incorporates a corrugated metal sheet (19) which supports one or more panel elements (22) which constitute a wearing layer. The corrugated metal sheet has elongate recesses (23) in the form of indentations in the corrugation peaks closest to the wearing layer (22). These recesses (23) have arranged in them a first part (24) of a velcro fastening, preferably a velcro fastening hook part. On the surface of the panel element, a second part of a velcro fastening, preferably its felt part, is arranged on the portion of the surface (26) which is situated centrally to the recesses (23) when the panel (22) rests on the loadbearing structure (21).

One recess (23) is enlarged in the diagram to show in more detail the positioning of the velcro fastening. The enlarged recess has exaggerated dimensions, so the dimensions indicated below may seem not to correspond to the diagram. In this embodiment, the shape of the recesses (23) is also such that the surfaces (26,27) on which the velcro fastening's two parts (24,25) are arranged are situated at a certain distance from one another when the panel (22) is placed on the loadbearing structure. The depth of the recess is less than half, but more than 5%, of the combined thickness of the hook part and the felt part when they are separated from one another. This means that the velcro fastening's two parts (24,25) can be reliably hooked securely together while at the same time the velcro is protected from crushing. The best protection from crushing in this embodiment is if the hook part (24) is arranged in the recess (23), but it would also be possible for the felt part (25) to be situated there and the hook part (24) on the panel element (22).

In this embodiment too the velcro fastenings may be arranged in elongate strips along the whole length of the platform. The recesses (23) may in this embodiment too be arranged in the panel element (22), in which case they constitute the top plane of the loadbearing structure. Likewise the recesses (8) in FIG. 2 may be arranged in the cross-members (6) instead, in which case the panel surface is even.

Figure 4:
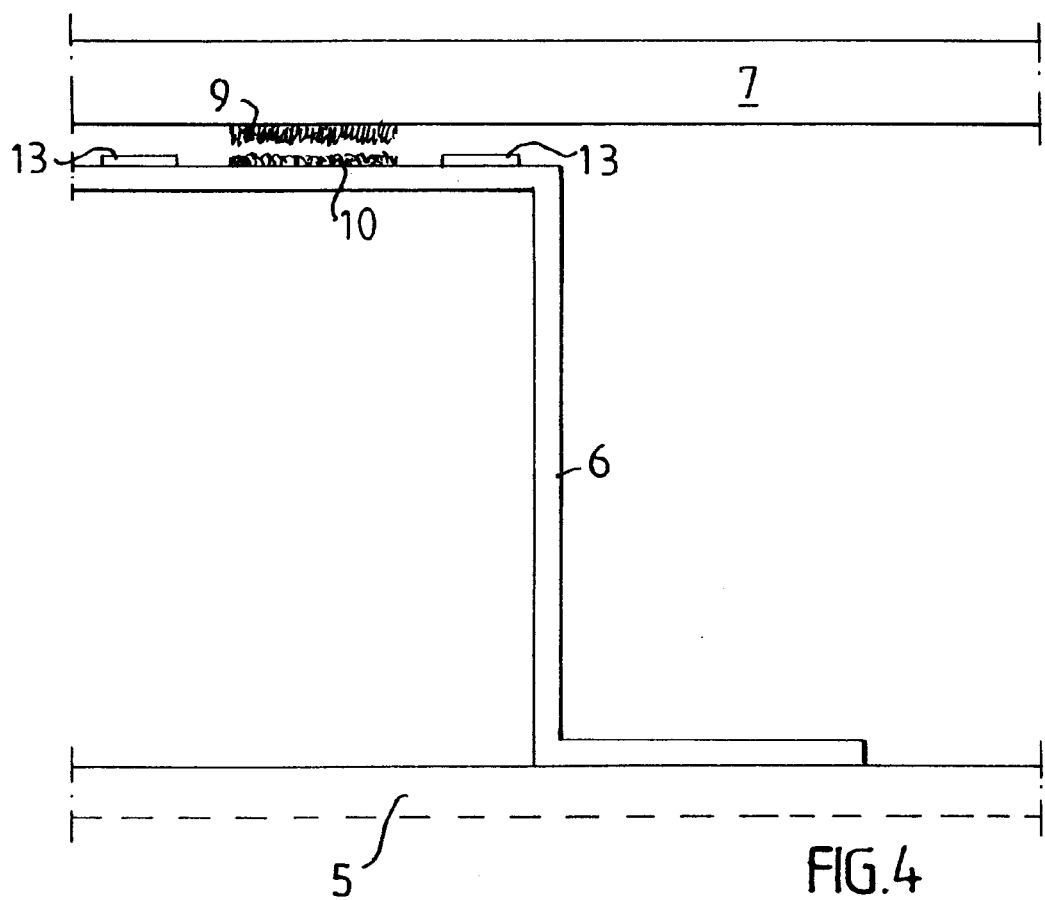
FIG. 4 is a fragment of a longitudinal section of an alternate embodiment.

In a third embodiment shown in FIG. 4 both the panel elements 7 and the loadbearing structure 5 have planar surfaces with the velcro parts arranged centrally to one another on the respective surfaces. This is seen only for panel elements 7, as the normally connected parts at the top are shown separated. In this case, the distance between said parts is created by means of spacing elements 13 placed between the panel elements and the vehicle's loadbearing structure. The height of the spacing elements is less than half the combined thickness of the hook part and felt part when the latter are separated from one another, but more than 10% of the thickness of one of the velcro parts. The height of the spacing elements is preferably one-quarter of the combined thickness of the hook part and the felt part when the latter are separated from one another. The spacing elements have the same effect as the previously described recesses in that the velcro fastening's hook and felt parts can reliably engage with one another and hence absorb shearing forces while at the same time the distance between their fastening surfaces reduces the risk of the velcro being crushed at high spot-loads.

The method according to the invention is described here in terms of one of several possible embodiments, namely fitting a wearing surface to a vehicle platform. In this case the lower surface of the wearing surface is provided with a number of recesses. An already engaged velcro fastening is fastened to the wearing surface in the recesses by the hook part being securely bonded thereto, e.g. by means of fusible contact adhesive 22 from Binder Systemteknik Nordica AB. The felt part thus already fastened to the hook part is provided on its underside with adhesive, e.g. fusible contact adhesive 37 from Binder, which is protected by a protective film. The protective film is pulled off and the wearing surface, with the velcro fastening attached to it, is fastened to the platform by the felt part bonding securely upon being brought into contact with the platform The recesses in the wearing surface cause the surfaces carrying the velcro to be situated slightly apart from one another. The fact that before assembly the hook part is already engaged securely with the felt part means that no great force is needed for ensuring the fastening together of the two velcro parts after the wearing surface has been placed on the platform. The wearing surface thus becomes securely fastened to the platform and can absorb large shearing forces. The velcro fastening also has noise insulating properties.

Alternatively, the felt part may be fastened to the platform and the hook part to the wearing surface, separately from one another. However, this requires greater precision when the wearing surface is lifted up onto the platform, so that the velcro fastening's two parts are central to one another. It also involves significantly more force (manual or mechanical) for pressing the wearing surface onto the platform to ensure that all the hooks engage with the felt. The two velcro components are bonded securely to their respective surfaces, preferably with fusible adhesive. Other methods of fastening may also be envisaged, such as tape which is adhesive on both sides.

On the occasion of any replacement of the wearing surface, it can be freed manually or mechanically from the platform by parting the hook parts from the felt parts. It will then be easy to apply a new wearing surface to the platform in the manner described above.

The method is also applicable to the other previously described embodiments, e.g. with the recesses arranged in the platform or with spacing elements arranged between the surfaces.

An important aspect of the method of assembly is that the depth of the recesses be less than half the thickness of the velcro fastening (aggregate of the hook and felt parts when they are separated from one another), otherwise the respective velcro parts will not engage or one part of the velcro fastening will not bond to its component in cases where the whole velcro fastening is first bonded to one of the components.

The panel elements and the loadbearing structure need of course not be a truck platform with associated wearing layer but may instead consist of other vehicle components, e.g. a bus chassis with associated bus floor.

The embodiments described above do not cause any limitation of the invention, which may also be employed otherwise than as described above.

What is claimed is:

1. An arrangement for fastening a first element having a first surface to a second element having a second surface, comprising:
    a hook and felt fastening comprised of a hook part and a felt part, the parts of the fastening being separable or adhereable together, a first one of the parts being attached to a first area of the first surface of the first element, a second one of the parts being attached to a second area of the second surface of the second element, wherein the first area of the first surface of the first panel element where the first part is arranged is situated centrally to the second area of the second surface of the second part where the second part is arranged but the first area and the second area are spaced a predetermined distance from one another yet are sufficiently close together that the first and second parts engage when the first and second surfaces are overlaid on each other except at the first and second areas which are spaced apart.

2. The arrangement of claim 1, wherein at least one of the first and second surface areas comprises a recess in the respective one of the first and second surfaces of a depth selected so that when the fist and second pats are installed in the fist and second areas and the first and second surfaces are overlaid, the first and second parts engage.

3. The arrangement of claim 1, wherein the first element is a panel shaped element having the first surface and the second element is a vehicle having the second surface to which the first surface is to be placed.

4. The arrangement of claim 3, wherein at least one of the first and second areas comprises a recess in the respective one of the first and second surfaces, the recess being of a depth selected so that with the fist and second pats installed in the first and second areas of the first and second surfaces, the first and second parts engage.

5. The arrangement of claim 3, wherein one of the first and second areas comprises a recess in the respective one of the first and second surfaces and the hook part is arranged in the recess.

6. The arrangement of claim 1, further comprising spacer elements between the fist surface of the panel element and the second surface of the vehicle in the vicinity of the fastening for retaining the first and second areas spaced at the predetermined distance.

7. The arrangement of claim 3, wherein the first part attached to the panel is arranged in separated first strips fastened on the fist surface and the first surface having separated first areas for receiving the separated first strips, the vehicle second surface having separated second areas and the second part is also arranged in separated second areas; the first and second areas are situated centrally to each other and the first and second areas and tie strips therein are oriented transversely to the longitudinal direction of the vehicle.

8. The arrangement of claim 3, wherein the first part attached to the panel is arranged in separated first strips fastened on the first surface and the first surface having separated first areas for receiving the separated first strips, the vehicle second surface having separated second areas and the second part is also arranged in separated second areas; the first and second areas are situated centrally to each other and the first and second areas and the strips therein are oriented in the longitudinal direction of the vehicle.

9. The arrangement of claim 3, wherein the panel element comprises at least one floor panel of the vehicle and the part of the vehicle comprises a load platform or a body of a bus.

10. The arrangement of claim 1, wherein the predetermined distance between the first and second areas is less than half the combined thickness of the hook part and the felt part of the fasting when they are separated from one another.

11. The arrangement of claim 3, wherein the predetermined distance between the first and second areas is less than half the combined thickness of the hook part and the felt part of the fastening when they are separated from one another.

12. A method for fastening a panel to a surface of a vehicle, comprising providing a hoop and felt fastening including a hook part and a felt part which are attachable together and separable;
    attaching a first of the parts of the fastening to a first area of a first surface of the panel before the panel is attached to a second surface of the vehicle which is intended to support the panel;
    attaching a second part of the fastening to a second area of a second surface of the vehicle; and
    positioning the first part of the fastening centrally to and spaced at a distance from the second part of the fastening over the first and second surface areas where the fist and second parts of the fastening are disposed.

13. The method of clam 12, wherein one of the first and second parts of the fastening is disposed in a recess in the respective one of the panel and the vehicle part and the panel is thereafter applied to the vehicle part for disposing the parts of the fastening in contact for fastening the panel to the vehicle by the fastening and fastening the second part to the other of the panel and the vehicle part.

14. The method of claim 13, wherein the first part of the fastening including the hook part and having the second part of the fastening including the felt part are engaged before being placed in a recess in one of the panel and the vehicle part.

15. The method of claim 12, wherein the second part of the fastening is attached to the vehicle part, then the panel is fastened to the vehicle by pressing together the first and second parts of the fastening.

16. The method of claim 12, further comprising placing spacing elements between the panel and the vehicle part for defining the spacing between the first and second areas of the first and second surfaces.

17. The method of claim 12, further comprising forming each of the first and second parts in the form of strips, and attaching the strips of one of the first and second parts to the panel and the other of the first and second parts to the vehicle part at locations where the first and second parts are central to each other at respective areas on the first and second surfaces.

18. The method of claim 17, comprising arranging the strips to extend transversely to the longitudinal direction of the vehicle.

19. The method of claim 17, comprising arranging the strips to extend along the longitudinal direction of the vehicle.

* * * * *